United States Patent Office 3,123,577
Patented Mar. 3, 1964

3,123,577
METHOD OF LIQUEFYING CELLULAR POLYURETHANE PLASTICS
Herbert L. Heiss, Cider Run, New Martinsville, W. Va., assignor to Mobay Chemical Company, Pittsburgh, Pa., a corporation of Delaware
No Drawing. Filed Nov. 14, 1960, Ser. No. 68,644
3 Claims. (Cl. 260—2.3)

This invention relates generally to a method of liquefying cellular polyurethane plastics and more particularly to a method of mechanically subdividing polyurethane plastics so that they will go into solution faster in a liquid resin.

It has been proposed heretofore in U.S. Patent 2,937,151 to cut or grind cellular polyurethane plastics into small pieces and then dissolve the pieces in a linear polyester resin heated to a relatively high temperature of about 250° C. or more. Cutting or grinding the cellular polyurethane is an expensive and time consuming process. Moreover, neither the cut nor ground product goes into solution enough faster to justify the time and expense. Even the cut or ground product will not dissolve in a polyester for example, at a low enough temperature to prevent discoloration.

It is, therefore, an object of this invention to provide a method of rapidly reducing the size and simultaneously increasing the wettability of cellular polyurethane plastics so that they may be liquefied faster. Still another object of this invention is to provide an improved method of liquefying cellular polyurethane plastics based on polyhydric polyalkylene ethers. Another object of this invention is to provide an improved method of mechanically reducing a cellular polyurethane plastic so that it can be more rapidly dissolved in a liquid resin. A further object of this invention is to provide for the preparation of polyurethane plastics from inexpensive raw materials.

The foregoing objects and others which will become apparent from the following description are accomplished in accordance with the invention, generally speaking, by providing a method of subdividing cellular polyurethane plastics which comprises passing the cellular polyurethane through a roller mill, the rolls of which are operating at different speeds. The rubbing action of the roller mill tears the cellular polyurethane into small pieces without agglomeration thereof. The torn pieces of cellular polyurethane have many uses, for example, as a filling for pillows, upholstery articles and the like. They can also be bound together with an adhesive to produce an article which has a greater density than the original cellular polyurethane and which can be used as a packing material, for example. The volume of the milled cellular polyurethane is so reduced that it makes an improved filler or rug underlay, for example.

The method of subdividing the cellular polyurethane plastics is most applicable, however, to the liquefaction of cellular polyurethane plastics in a fluid such as water or an organic fluid. It is preferred that the water or organic media be in the liquid state at the temperature and pressure of the reaction. The organic media may be one which will react with the urethane and/or urea groups of the cellular polyurethane plastic or the fluid may act as a heat transfer media in the presence of a catalyst which will cause dissociation of the urethane and/or urea groups. In either type of reaction it is preferred to heat the fluid to a temperature of at least about 150° C. and then add the milled cellular polyurethane thereto.

Any suitable roller mill may be used in accordance with the invention. A roller mill consists of two or more rolls operating at different speeds which not only tends to force the cellular polyurethane between the rolls but also subjects it to a rubbing action which tears the cellular polyurethane into small pieces. The typical roller mill may be any standard size such as, for example, 5 x 12 inches, 12 x 30 inches, 16 x 40 inches or 20 x 60 inches and the like. Distance between the rolls is controlled so that any desired distance may be maintained. It is preferred that the distance between the rolls be between about .005 and about .025 inch. It is also preferred in accordance with this invention to use a roller mill having only two rollers. Thus, when one roller has a velocity of from about 25 to about 50 r.p.m. the other roller may have a velocity between about 27 r.p.m. and about 100 r.p.m. A most satisfactory tearing action can be obtained by operating one roller at a speed of about 30 r.p.m. while the other is operated at a speed of about 34 to about 38 r.p.m. while the rollers are spaced at about .005 inch apart. It is further preferable to operate the rollers at speeds between about 15 and about 100 r.p.m. with one roller having a velocity from about 1.07 to about 2 times faster than the other. It is usually only necessary to pass the polyurethane plastic through the mill one time and indeed one pass through the mill is preferred.

The invention is most applicable to the liquefaction of cellular polyether polyurethane plastics because the cellular polyester polyurethane plastics often become too agglomerated to be rapidly dissolved when passed through a roller mill. On the other hand, the polyether polyurethane plastics are torn by the rubbing action of the mill into small pieces without being agglomerated. These small pieces can then be conveyed to the water or organic media where the polyether polyurethane is dissolved in a short time, usually less than about 10 minutes. The process of the invention, therefore, involves a simple and convenient method of dissolving cellular polyurethanes. The cellular polyurethane after it has been subdivided by passing it through a rubber mill is placed in the medium where it dissolves in a short time. Often from about 5 to about 15 minutes is sufficient to dissolve the milled cellular polyurethane.

Any suitable fluid, as more particularly pointed out above, may be used in accordance with the method of this invention. If water is used in the liquid state, it should be under sufficient pressure so that it will be liquid at a temperature of about 150° C. or more. It is also possible to use steam, however, since water will not react with cellular polyurethane plastic, but is this event it is necessary to use a metal catalyst as more particularly set forth below in order to promote the degradation of the cellular polyurethane plastic.

Any suitable organic fluid may be used including hydrocarbons, chlorinated hydrocarbons, esters, ethers, thioethers, amides, ureas any of which may contain free hydroxyl groups or amino groups and which may be substituted with various substituents such as halogen including chlorine, bromine, iodine, fluorine and the like as well as nitro groups and the like. Unless the organic compound contains free carboxyl groups or free primary or secondary amino groups, it will be necessary to have one of the metal catalysts present during the reaction or the reaction temperature will have to be above about 250° C. If the metal catalyst is used, a reaction temperature between about 150° C. and about 225° C. is usually sufficient to bring about at least partial dissolution of the milled cellular polyurethane plastic. Any suitable organic fluid of this type may be used such as, for example, benzene, naphthalene, toluene, hexane, heptane and the like, 4,4'-dichlorodiphenylmethane, o-dichlorobenzene, methylene chloride as well as other suitable resins including, for example, polyhydric alcohols, polyhydric polyalkylene ethers, hydroxyl polyesters, polyhydric polythioethers and the like. These compounds preferably have a molecular weight of at least about 500 and hydroxyl numbers within the range of from about 25 to about 600. They are preferably liquid at room temperature. Any suitable polyhydric polyalkylene ether may be used such as, for example, the condensation product of an alkylene oxide or of an alkylene oxide with a polyhydric alcohol. Any suitable polyhydric alcohol may be used such as those disclosed below for use in the preparation of the hydroxyl polyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols, and the like. It is often advantageous to employ some trihydric or higher polyhydric alcohol such as glycerine, trimethylolpropane, pentaerythritol, and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and in Encyclopedia of Chemical Technology, vol. 7, pages 257–262, published by Interscience Publishers Inc. (1951), or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

Any suitable hydroxy polyester may be used such as are obtained, for example, from polycarboxylic acids, and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, betahydromuconic acid, alpha-butyl-alpha-ethyl-glutaric acid, alpha-beta-diethylsuccinic acid, isophthalic acid, terephthalic acid, hemilellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylolpropane, 1,3,6-hexanetriol, triethanolamine, pentaerythritol, sorbitol and the like.

The invention is most applicable to the preparation of resins from cellular polyurethane plastics and polyhydric polyalkylene ethers since it is here that the catalyst exerts the greatest effect and the polyurethane may be liquefied in the shortest amount of time. Moreover, in accordance with a preferred embodiment of this invention, a cellular polyurethane plastic is passed through a rubber mill and is then combined with a mixture of a hot polyhydric polyalkylene ether and a tin catalyst. The mixture of tin catalyst and polyhydric polyalkylene ether is preferably heated to a temperature within the range of from about 190° C. to about 220° C. for a period of time, preferably at least about 5 minutes, until the polyurethane becomes liquefied.

Any suitable metal catalyst may be used to promote the degradation of the cellular polyurethane plastic. The preferred catalysts are compounds having the formula $$Me(OR)_m X_{n-m}$$

wherein Me is a metal having an atomic number of from 21 to 92 and preferably from 21 to 83, R is an organic radical, $n$ is the valence of the metal Me, $m$ is 0 or a positive integer at most equal to the valence of the metal and X is alkyl, aryl, cycloalkyl, heterocyclic, halogen, oxygen, nitrate, nitrite, sulfate, sulfite, carbonate, phosphate, stannate, arsenite, arsenate, organic carboxylate, hydroxy, amide, borate and the like. Suitable compounds are therefore scandium nitrate, titanium acetyl acetonate, vanadium acetyl acetonate, chromium acetyl acetonate, manganous acetyl acetonate, iron acetyl acetonate, cobalt oxide, nickel acetyl acetonate, copper acetyl acetonate, zinc acetyl acetonate, aluminum acetyl acetonate, bismuth stannate, bismuth nitrate, thorium acetyl acetonate, arsenic triiodide, molybdenum pentachloride, uranyl acetate, copper nitrite, stannous sulfate, nickel sulfite, strontium carbonate, zinc phosphate, nickel arsenite, nickel arsenate, copper hydroxide, methyl triborine triamine, copper borate and the like. The preferred metal catalysts are the tin compounds.

Any suitable tin compound may be used including stannous chloride, dialkyl tin chlorides, dialkyl tin oxides, trialkyl tin oxides, dialkyl tin sulfides, dialkyl tin dialkoxides, alkyl tin trialkoxides, dialkyl tin diphenates, alkyl tin triphenates, dialkyl tin dinaphthanates, alkyl tin trinaphthanates, alkyl tin trihalides, trialkyl tin halides, stannous salts of carboxylic acids, dialkyl tin salts of carboxylic acids, and the like. Specific examples include stannous octoate, stannous oleate, stannous stearate, stannous acetate, stannous adipate, stannous maleate, stannous succinate, di(2-ethyl hexyl) tin oxide, dibutyl tin oxide, dioctyl tin oxide, diethyl tin oxide, dipropyl tin oxide, diisopropyl tin oxide, dioctyl tin oxide, dibutyl tin diacetate, dibutyl tin diformate, dipropyl tin diacetate, diisopropyl tin diacetate, dipropyl tin dioleate, dipropyl tin dipropionate, dibutyl tin di(2-ethyl hexoate), dimethyl tin adipate, dibutyl tin maleate, dibutyl tin succinate, dimethyl tin sulfide, diethyl tin sulfide, methyl ethyl tin sulfide, dipropyl tin sulfide, methyl propyl tin sulfide, diisopropyl tin sulfide, dibutyl tin sulfide, ethyl butyl tin sulfide, dioctyl tin sulfide, methyl octyl tin sulfide, diheptyl tin sulfide, dihexadecyl tin sulfide, dioctadecyl tin sulfide, dimethyl tin dimethoxide, dimethyl tin diethoxide, dibutyl tin dibutoxide, dimethyl tin dibutoxide, ethyl tin tributoxide, heptadecyl tin tributoxide, octadecyl tin trimethoxide, amyl tin triethoxide, dibutyl tin bis-(o-phenyl phenate), dimethyl tin bis-(o-phenyl phenate), diethyl tin bis-(o-phenyl phenate), diamyl tin bis-(o-naphthyl naphthanate), butyl tin tri-(o-phenyl phenate), cyclohexyl tin bis-(o-phenyl phenate), tributyl tin chloride, dibutyl tin dichloride, butyl tin trichloride, trimethyl tin chloride, dimethyl tin dichloride, methyl tin trichloride, triethyl tin bromide, tributyl tin iodide, trioctyl tin chloride, diamyl tin diiodide, amyl tin triiodide, hexyl tin trichloride, tripropyl tin fluoride, triisopropyl tin chloride, triisobutyl tin chloride, diheptyl tin dichloride, nonyl tin trichloride, tetra m-xylyl tin, tetracyclohexyl tin, di-beta-furfuryl tin and the like.

In accordance with a preferred embodiment of this invention cellular polyether polyurethanes are liquefied in a polyhydric polyalkylene ether and then the resulting resin is reacted with an organic polyisocyanate in the presence of a blowing agent to prepare a new cellular polyether polyurethane. As previously stated, this process is very important because one may thereby economically dispose of scrap material. Since the use of a metal compound as a catalyst lowers the temperature at which the solid polyurethane will become liquid enough to be further reacted with organic polyisocyanates in the presence of a blowing agent, the color of the resulting resin and consequently the new cellular polyurethane is considerably improved. In practice, the amount of polyurethane which can be solubilized in the resin is dependent on the viscosity of the resulting material. Usually up to about 1000 percent by volume or about 30 percent by weight of the cellular polyurethane can be mixed into the liquid resin based on the weight of the resin. In most cases manufacturers can include up to 10 percent by weight of polyurethane in the resin and thus use all of the waste material they have. Since the process of solubilization can be carried out at a low temperature in a short period of time, often less than 10 minutes, the invention is particularly important for this process.

Any suitable organic polyisocyanate may be used for the preparation of either the original polyurethane plastic which results in scrap or waste used in the process of the invention or for the production of new polyurethane plastics from the resin containing the old polyurethane resin solubilized therein including for example, aromatic, aliphatic and heterocyclic polyisocyanates. In other words, two or more isocyanate radicals may be bonded to any suitable divalent or higher polyvalent organic radical to produce the organic polyisocyanates which are useful in accordance with the present invention including acyclic, alicyclic, aromatic and heterocyclic radicals. Suitable organic polyisocyanates are, therefore, ethylene diisocyanate, ethylidene diisocyanate, propylene-1,2-diisocyanate, cyclohexylene-1,2-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, p,p',p''-triphenylmethane triisocyanate, 1,5-naphthalene diisocyanate, furfurylidene diisocyanate or polyisocyanates in a blocked or inactive form such as the bis-phenyl carbamates of 2,4- or 2,6-toluylene diisocyanate, p,p'-diphenylmethane diisocyanate, p-phenylene diisocyanate, 1,5-naphthalene diisocyanate and the like. It is preferred to use the commercially available mixture of toluylene diisocyanate which contains 80 percent 2,4-toluylene diisocyanate and 20 percent 2,6-toluylene diisocyanate or 4,4'-diphenylmethane diisocyanate.

Any suitable blowing agent may be used such as, for example, water, halohydrocarbons, such as, for example dichlorodifluoromethane, trichlorofluoromethane and the like.

It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Patent 2,834,748. Where polyhydric polyalkylene ethers are included in the reaction mixture to prepare a cellular polyurethane plastic, it is preferred to employ a silicone oil of the above patent within the scope of the formula

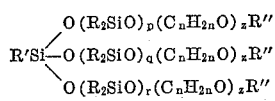

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

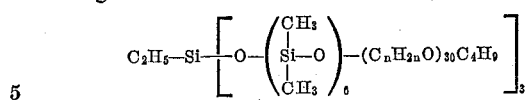

wherein $(C_nH_{2n}O)$ is a mixed polyoxyethylene and oxypropylene block copolymer containing about 17 oxyethylene units and about 13 oxypropylene units.

It is preferred to include a catalyst in the reaction mixture leading to the production of the cellular polyurethane plastics. Suitable catalysts are, for example, tertiary amines, such as, for example, triethylene diamine, N-methyl morpholine, N-ethyl morpholine, diethyl ethanolamine, N-coco morpholine, 1-methyl-4-dimethylamino ethyl piperazine, 3-methoxy-N-dimethyl propyl amine, N-dimethyl-N'-methyl isopropyl propylene diamine, dimethyl benzyl amine and the like. Other suitable catalysts are for example, tin compounds such as, stannous chloride, tin salts of carboxylic acids, such as dibutyl tin di-2-ethyl hexoate, tin alcoholates such as stannous octylate, as well as other organo metallic compounds such as are disclosed in U.S. Patent 2,846,408.

Other new polyurethanes may be prepared in accordance with previously disclosed processes including the preparation of castings, moldings, coatings and the like as disclosed for example in U.S. Patents 2,621,166, 2,729,618 and 2,948,691.

The utility of polyurethane plastics is well known and the resins prepared according to this invention may be used for the production of polyurethane plastics including both cellular and noncellular polyurethane plastics which may in turn be used for the production of thermal and sound insulation, castings, such as bearings, gear wheels and the like.

The invention is further illustrated by the following examples in which the parts are by weight unless otherwise indicated.

*Example 1*

(a) A cellular polyurethane plastic is prepared as follows: About 100 parts of a trihydric polyalkylene ether prepared from about 1 part of glycerine and about 30 parts of propylene oxide by condensation thereof to a molecular weight of about 3000 and having an hydroxyl number of about 56 are mixed with about 40 parts of a mixture of 80 percent 2,4- and 20 percent 2,6-toluylene diisocyanate, about 0.35 part of stannous octoate, about 0.35 part N-ethyl morpholine, about 0.05 part of 1-methyl-4-dimethyl amino ethyl piperazine, about 1 part of a silicone oil having the formula

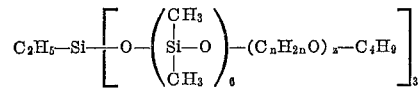

wherein $(C_nH_{2n}O)$ represents about 17 oxyethylene units and about 13 oxypropylene units and $z$ is equal to about 30 are also mixed with the other ingredients substantially simultaneously, and about 3.2 parts of water are mixed in an injection mixer as described in U.S. Reissue Patent 24,514. The resulting cellular polyurethane plastic has the following physical properties:

Density _____ lbs./ft.³__ 2
Tensile strength _____ lbs./in.²__ 17
Elongation _____ percent__ 280

(b) About 100 parts of a trihydric polyalkylene ether prepared from about 1 part of glycerine and about 30 parts of propylene oxide by condensation thereof to a molecular weight of about 3000, said trihydric polyalkylene ether having an hydroxyl number of about 56 are mixed with about 0.3 part of stannous octoate in a resin kettle and heated to about 200° C. About 21 parts of the cellular polyurethane plastic prepared in Example 1(a) which has previously been subdivided by passing it through a two-roll roller mill, one roll of which is rotating at a velocity of about 30 r.p.m. and the other at about 36 r.p.m., are slowly added to the hot mixture. Only about 7 minutes are required for the addition and complete liquefaction of the milled cellular polyurethane plastic. The resulting resin has a viscosity of about 4825 cp. 25° C.

(c) About 100 parts of the resin prepared in Example 1(b) are reacted with about 40 parts of a mixture of 80 percent 2,4- and 20 percent 2,6-toluylene diisocyanate and about 3.2 parts of water in a machine mixer as disclosed in U.S. Reissue Patent 24,514 to prepare a cellular polyurethane plastic which has a density of about 1.8 lbs./ft.$^3$ and good physical properties.

*Example 2*

(a) About 100 parts of the trihydric polyalkylene ether employed in Example 1(b) are heated in a resin kettle to a temperature of about 200° C. and mixed with about 0.3 part of stannous octoate. About 25 parts of the cellular polyurethane plastic prepared in Example 1(a) which has previously been subdivided by passing it through the roller mill of Example 1(b). The milled cellular polyurethane plastic can be added to the trihydric polyalkylene ether and completely liquefied in less than about 15 minutes.

(b) About 50 parts of the resin obtained in Example 2(a) are blended with about 50 parts of the trihydric polyalkylene ether employed in Example 1(b) and the blend is mixed with about 41 parts of a mixture of 80 percent 2,4- and 20 percent 2,6-toluylene diisocyanate, about 0.35 part of stannous octoate, about 0.35 part of N-ethyl morpholine, about 0.05 part of 1-methyl-4-dimethyl amino ethyl piperazine, about 1 part of the silicone oil used in Example 1(a) and about 3.2 parts of water on a machine mixer as disclosed in U.S. Reissue Patent 24,514. The resin blend is added to the mixture at a temperature of about 25° C. and at a rate of about 6750 grams per minute. The agitator speed on the machine is about 5000 r.p.m. The mixture is expelled from the machine into the mold and assumes a creamy appearance, i.e. gas bubbles begin to form in about 8 seconds. The foaming reaction is completed in about 70 seconds and a cellular polyurethane plastic is obtained which has the following physical properties.

| | |
|---|---|
| Density _____lbs./ft.$^3$__ | 1.7 |
| Tensile strength _____lbs./in.$^2$__ | 21.7 |
| Elongation _____percent__ | 310 |
| Tear strength _____lbs./in.__ | 2.6 |
| Compression deflection, 25%/25% R _____ | .41/.35 |

It is to be understood that any other suitable resin, tin catalyst, organic polyisocyanate or the like employed in the preceding examples could have been substituted with others in accordance with the foregoing disclosure.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. The method of mechanically reducing a flexible cellular polyether polyurethane plastic which comprises passing said cellular polyether polyurethane through a roller mill having only two rolls rotating together at different speeds, the space between the rollers being between about 0.005 and about 0.025 inch.

2. The method of claim 1 wherein the speed of one roller is from about 25 to about 50 r.p.m. while the speed of the other roller is faster and within the range of from about 27 r.p.m. to about 100 r.p.m.

3. The method of mechanically reducing a flexible cellular polyurethane plastic which comprises passing said cellular polyurethane through a roller mill having at least two rolls operating at different speeds.

References Cited in the file of this patent

UNITED STATES PATENTS

| 1,308,007 | Forsyth _____ June 24, 1919 |
| 1,713,487 | Torrance _____ May 14, 1929 |
| 2,937,151 | Ten Broeck et al. _____ May 17, 1960 |

FOREIGN PATENTS

| 805,561 | Great Britain _____ Dec. 10, 1958 |
| 822,561 | Great Britain _____ Oct. 28, 1959 |
| 111,981 | Switzerland _____ Feb. 1, 1926 |

OTHER REFERENCES

Mobay Publication, Nov. 10, 1958, "A One Shot System For Flexible Polyether-Urethane Foams."